United States Patent
Hayashi et al.

(10) Patent No.: US 9,928,945 B2
(45) Date of Patent: Mar. 27, 2018

(54) PRODUCTION METHOD FOR PARTICLES OF ELEMENT HAVING STANDARD ELECTRODE POTENTIAL GREATER THAN 0V

(71) Applicant: NIPPON SODA CO., LTD., Tokyo (JP)

(72) Inventors: Kenichi Hayashi, Joetsu (JP); Makoto Toyooka, Joetsu (JP)

(73) Assignee: NIPPON SODA CO., LTD., Tokyo (JP)

( * ) Notice: Subject to any disclaimer, the term of this patent is extended or adjusted under 35 U.S.C. 154(b) by 227 days.

(21) Appl. No.: 14/435,044

(22) PCT Filed: Oct. 18, 2013

(86) PCT No.: PCT/JP2013/078282
§ 371 (c)(1),
(2) Date: Apr. 10, 2015

(87) PCT Pub. No.: WO2014/065204
PCT Pub. Date: May 1, 2014

(65) Prior Publication Data
US 2015/0287503 A1 Oct. 8, 2015

(30) Foreign Application Priority Data

Oct. 24, 2012 (JP) ................................ 2012-234989
Jan. 28, 2013 (JP) ................................ 2013-013232

(51) Int. Cl.
*H01B 1/12* (2006.01)
*H01B 13/00* (2006.01)
(Continued)

(52) U.S. Cl.
CPC ........... *H01B 13/0036* (2013.01); *B22F 9/24* (2013.01); *C01B 7/14* (2013.01); *C01B 17/0253* (2013.01);
(Continued)

(58) Field of Classification Search
CPC ... C08K 3/08; C08K 2003/0831; C08L 83/16; B22F 9/24; C01B 17/0253; C01B 19/02;
(Continued)

(56) References Cited

U.S. PATENT DOCUMENTS 6,485,831 B1   11/2002   Fukushima et al.
2004/0259154 A1   12/2004   Sakurai et al.
(Continued)

FOREIGN PATENT DOCUMENTS

CN   101646491 A   2/2010
EP   1867752 A1   12/2007
(Continued)

OTHER PUBLICATIONS

Ashenhurst, J., "Polar Protic? Polar Aprotic? Nonpolar? All About Solvents" http://www.masterorganicchemistry.com/2012/04/27/polar-protic-polar-aprotic-nonpolar-all-about-solvents/ Apr. 27, 2012.*

(Continued)

*Primary Examiner* — Mark Kopec
*Assistant Examiner* — Jaison P Thomas
(74) *Attorney, Agent, or Firm* — Oliff PLC (57) ABSTRACT

The present invention provides: a method for producing particles of an element having a standard electrode potential greater than 0V, characterized by using in a protic solvent solution a polysilane having a poor solubility in an aprotic solvent, to produce particles of the element from ions of at least one element having a standard electrode potential greater than 0V; and a composite body of polysilane and the (Continued)

particles of an element having a standard electrode potential greater than 0V, in which the particles of the at least one element having a standard electrode potential greater than 0V (provided that palladium is not included in the element, in the case where the polysilane is a dimethyl polysilane) are adsorbed in the polysilane having poor solubility in an aprotic solvent.

6 Claims, 2 Drawing Sheets (51) Int. Cl.
*B22F 9/24* (2006.01)
*C01B 7/14* (2006.01)
*C08L 83/16* (2006.01)
*C02F 1/28* (2006.01)
*C01B 17/02* (2006.01)
*C01B 19/02* (2006.01)
*C22B 3/00* (2006.01)
*C22B 15/00* (2006.01)
*C08G 77/60* (2006.01)

(52) U.S. Cl.
CPC .............. *C01B 19/02* (2013.01); *C02F 1/281* (2013.01); *C08L 83/16* (2013.01); *C22B 11/04* (2013.01); *C22B 15/0089* (2013.01); *H01B 1/125* (2013.01); *C02F 1/288* (2013.01); *C08G 77/60* (2013.01)

(58) Field of Classification Search
CPC . C01B 7/14; C02F 1/281; C02F 1/288; C08G 77/60; C25C 5/02; H01B 13/0036; H01B 1/12; C22B 11/04; C22B 15/0089
See application file for complete search history.

(56) References Cited

U.S. PATENT DOCUMENTS

2009/0143607 A1* 6/2009 Kobayashi .......... C07F 15/0093
556/443

2010/0280296 A1 11/2010 Bisson et al.
2012/0321996 A1 12/2012 Ito
2015/0018506 A1* 1/2015 Hayashi ................ C08G 77/60
528/10

FOREIGN PATENT DOCUMENTS

| JP | 2002-134123 A | 5/2002 |
| JP | 2005-314712 A | 11/2005 |
| JP | 2006-307084 A | 11/2006 |
| JP | 2007-260659 A | 10/2007 |
| JP | 2009035781 A | 2/2009 |
| JP | 2012-162772 A | 8/2012 |
| JP | 2013-031806 A | 2/2013 |
| TW | 554348 B | 9/2003 |
| WO | 2011/108162 A1 | 9/2011 |

OTHER PUBLICATIONS

Nov. 4, 2015 Office Action issued in Chinese Patent Application No. 201380054506.4.
Mar. 10, 2016 Office Action issued in Taiwanese Patent Application No. 102137885.
Anonymous: "Standard electrode potential (data page)", Interent Citation, Feb. 10, 2011, pp. 1-8, XP002621690, http://en.wikipedia.org/w/index.php?title=Standard _electrode_potential_(data_page) &printable=yes.
Jul. 12, 2016 Extended Search Report issued in European Patent Application No. 13848254.2.
Anonymous: "Standard electrode potential (data page)", Internet Citation, Feb. 10, 2011, pp. 1-8, XP002621690, http://en.wikipedia.org/w/index.php?title=Standard _electrode_potential_(data_page) &printable=yes.
Sakamoto, "Development of Organisilicon Polymer," Edited by Hideki Sakurai, CMS Books, p. 17, 1989.
Dec. 3, 2013 International Search Report issued in International Application No. PCT/JP2013/078282.
Miller et al., "Polysilane High Polymers," Chemical Reviews, 1989, vol. 89, No. 6, pp. 1359-1369.

* cited by examiner

PRODUCTION METHOD FOR PARTICLES OF ELEMENT HAVING STANDARD ELECTRODE POTENTIAL GREATER THAN 0V

TECHNICAL FIELD

The present invention relates to a method for producing particles of an element having a standard electrode potential greater than 0V from ions thereof present in a protic solvent solution using a polysilane having a poor solubility in a protic solvent.

The present invention claims priority on the basis of Japanese Patent Application No. 2012-234989 filed in Japan on Oct. 24, 2012, and Japanese Patent Application No. 2013-013232 filed in Japan on Jan. 28, 2013, the contents of which are incorporated herein by reference.

BACKGROUND OF THE INVENTION

A polysilane has σ electrons forming Si—Si bonds in the main chain thereof, the σ electrons being entirely delocalized in the main chain skeleton in a similar manner to π electrons in a carbon conjugated system. In view of the feature, the polysilane is expected to be used as a conductive material or an optical semiconductor. Furthermore, a solvent-soluble polysilane such as poly(methylphenylsilane) is also used as a carrier for a transition metal in recent years. For example, Patent Document 1 discloses that a method in which a polysilane and a transition metal compound are dissolved or suspended in a good solvent for the polysilane, mixed them in the presence or absence of a reductant, and then gradually adding a poor solvent for the polysilane to the mixture to cause phase separation makes it possible to produce a polysilane-carrying transition metal which has a high catalytic activity and which is easy to be handle, collect, and recycle. However, dimethylpolysilane and diphenylpolysilane are insoluble in almost all solvents, and are not melt (see, for example, Non-Patent Document 1). Therefore, they are difficult to handle, and so have mostly not been used.

On the other hand, a method for obtaining metallic particles by applying electrolysis to a metallic salt solution and a method for obtaining metallic particles by adding a reductant to a metallic salt solution are conventionally known as methods for obtaining metallic particles from metallic ions. The method in which a reductant is used generally requires use of an aprotic solvent, because the use of a protic solvent causes problems in which metal cannot be reduced and a reductant is decomposed, due to the high-reactivity between the reductant and the protic solvent.

Patent Document 2 discloses a method for obtaining metallic particles using water which is a protic solvent. In the method, metallic ions in an aqueous medium are reduced using hydrophilic micelles as a reductant to obtain metallic monodispersed nanoparticles, the hydrophilic micelles being obtained using a block copolymer composed of a hydrophilic polymer and a polysilane and having an inner portion formed of the polysilane and a cross-linked shell portion. The hydrophilic micelles react with a protic solvent and thereby become soluble in water.

DOCUMENTS OF RELATED ART

Patent Documents

Patent Document 1: Japanese Patent Application Laid-Open No. 2007-260659

Patent Document 2: Japanese Patent Application Laid-Open No. 2006-307084

Non-Patent Document

Non-Patent Document 1: "Development of organosilicon polymer" written by Kenkichi Sakamoto and edited by Hideki Sakurai, 1989, CMC books, page 17.

SUMMARY OF THE INVENTION

Problems to be Solved by the Invention

The present invention aims to provide a method for very simply producing particles of an element having a standard electrode potential greater than 0V from ions of the element in a protic solvent solution.

Means to Solve the Problems

The present invention relates to the following.
(1) A method for producing particles of an element having a standard electrode potential greater than 0V, including mixing a protic solvent solution containing: ions of at least one element having a standard electrode potential greater than 0V and a protic solvent with a polysilane having a poor solubility in the protic solvent to obtain particles of the element from ions of the element having a standard electrode potential greater than 0V.
(2) The method for producing particles of an element having a standard electrode potential greater than 0V according to (1) mentioned above, wherein the standard electrode potential of the element is no less than 0.2 V.
(3) The method for producing particles of an element having a standard electrode potential greater than 0V according to (2) mentioned above, wherein the element is at least one selected from the group consisting of gold, mercury, silver, rhodium, palladium, iodine, platinum, germanium, sulfur, ruthenium, osmium, iridium, rhenium, copper, tellurium, lead, arsenic, and bismuth.
(4) The method for producing particles of an element having a standard electrode potential greater than 0V according to (3) mentioned above, wherein the element is at least one selected from the group consisting of gold, mercury, silver, rhodium, iodine, platinum, germanium, sulfur, ruthenium, and bismuth, and the method further includes a step of collecting the particles of the element adsorbed in the polysilane.
(5) The method for producing particles of an element having a standard electrode potential greater than 0V according to (4) mentioned above, further including a step of burning the particles of the element adsorbed in the polysilane to obtain particles from which the polysilane is removed.
(6) The method for producing particles of an element having a standard electrode potential greater than 0V according to any one of (1) to (5) mentioned above, wherein the protic solvent solution further contains ions of at least one element having a standard electrode potential equal to or less than 0V.
(7) A composite body of particles of an element having a standard electrode potential greater than 0V and a polysilane, wherein particles of at least one element having a standard electrode potential greater than 0V (provided that the element is not palladium in a case where the polysilane is a dimethylpolysilane) adsorbed in the polysilane having a poor solubility in a protic solvent.

(8) The composite body of particles of an element having a standard electrode potential greater than 0V and a polysilane according to (7) mentioned above, wherein the element is at least one selected from the group consisting of gold, mercury, silver, rhodium, palladium, iodine, platinum, germanium, sulfur, ruthenium, osmium, iridium, rhenium, copper, tellurium, lead, arsenic, and bismuth.

Effects of the Invention

The method for producing particles of an element having a standard electrode potential greater than 0V, according to the present invention, makes it possible to efficiently and simply particulate ions of an element aimed to be particulated merely by adding a polysilane having a poor solubility against a protic solvent to a protic solvent solution containing the ions to make the ions contact with the polysilane. Furthermore, in the case where the protic solvent solution contains both ions of an element having a standard electrode potential equal to or less than 0V and ions of an element having a standard electrode potential greater than 0V, particles of the element having a standard electrode potential greater than 0V can be selectively produced.

Furthermore, in the composite body of particles of an element having a standard electrode potential greater than 0V and a polysilane, according to the present invention, the particles of the element having a standard electrode potential greater than 0V are adsorbed in the polysilane having a poor solubility in a protic solvent. Therefore, the particles of the element can be collected separately from the polysilane by baking the composite body to remove the polysilane therefrom.

EMBODIMENTS FOR CARRYING OUT THE INVENTION

The inventors of the present invention undertook intensive investigation to achieve the object described above, and thereby discovered that particles can be directly obtained from ions of an element having a standard electrode potential greater than 0V present in a protic solvent solution by using a polysilane having a poor solubility in a protic solvent acting as a reductant, and thereby completing the present invention.

A method for producing particles of an element having a standard electrode potential greater than 0V according to the present invention (hereinafter, may be abbreviated as "the method for producing particles according to the present invention") is characterized in that the particles of the element is produced using a polysilane having a poor solubility in a protic solvent from ions of at least one element having a standard electrode potential greater than 0V in a protic solvent solution. Since the poorly-soluble polysilane has a reduction function, the ions of the element are reduced by the polysilane in the protic solvent solution, and thereby the particles of the element are obtained.

The polysilane used in the method for producing particles according to the present invention has a poor solubility in a protic solvent. The term "poor solubility in a protic solvent" means that the solubility in water at room temperature is less than 1% by weight. In the case when the polysilane having a poor solubility in a protic solvent (hereinafter, abbreviated as "poorly-soluble polysilane") is added to a protic solvent solution containing ions of an element having a standard electrode potential greater than 0V (hereinafter, abbreviated as "element A") aimed to be particulated, the poorly-soluble polysilane disperses without being dissolved therein.

The poorly-soluble polysilane is preferably poorly-insoluble in an alcohol-based solvent, such as methanol, ethanol, isopropanol, or butanol; water; and a mixed solvent thereof, and more preferably poorly-soluble in methanol, ethanol, water, and a mixed solvent thereof.

The poorly-soluble polysilane used in the method for producing particles according to the present invention may be a polysilane having a Si—Si bond in the form of a liner, ring, branched-chain, net. The poorly-soluble polysilane may be a homopolymer or a copolymer. In the method for producing particles according to the present invention, one kind of the poorly-soluble polysilane may be solely used or two or more kinds thereof may be used in combination.

The poorly-soluble polysilane used in the method for producing particles according to the present invention is preferably a polysilane having a structure represented by at least one selected from the group consisting of the following general formulae (a) to (c) and (d), and more preferably a polysilane consisting of a structure represented by at least one selected from the group consisting of the following general formulae (a) to (c) and (d). For example, a polysilane consisting of a structure represented by the general formula (a) is a circular polysilane. In the general formulae (a) to (c), $R^1$, $R^2$, $R^3$, $R^4$, and $R^6$ each independently represents an alkyl group or an aryl group. In the general formula (b), $R^5$ represents a hydrogen atom, an alkyl group, or an aryl group.

In the case where $R^1$, $R^2$, $R^3$, $R^4$, $R^5$, or $R^6$ is an alkyl group, the alkyl group may be a liner alkyl group, a branched-chain alkyl group, or a cycloalkyl group. The alkyl group is preferably a C1-8 liner alkyl group, a C3-8 branched-chain alkyl group, or a C3-8 cycloalkyl group. Specific examples thereof include a methyl group, an ethyl group, an n-propyl group, an i-propyl group, an n-butyl group, an i-butyl group, an s-butyl group, a t-butyl group, an n-pentyl group, an n-hexyl group, a cyclopropyl group, a cyclobutyl group, a cyclopenthyl group, and a cyclohexyl group. Among these, a C1-6 liner alkyl group is preferable.

In the case where $R^1$, $R^2$, $R^4$, $R^5$, or $R^6$ is an aryl group, the aryl group may be a monocyclic or polycyclic group. Provided that the polycyclic aryl group has at least one aromatic ring, the remaining rings may be any of saturated rings, unsaturated rings, and aromatic rings. The aryl group is preferably a C6-10 aryl group, more preferably a phenyl group, a 1-napthyl group, a 2-naphtyl group, an azulenyl group, an indanyl group, or a tetralinyl group, and even more preferably a phenyl group.

The poorly-soluble polysilane used in the method for producing particles according to the present invention is preferably a dimethylpolysilane, a diphenylpolysilane, a polymer of a diphenylsilane and a monophenylsilane, a polymer of a dimethylsilane and a diphenylsilane, or a mixture thereof, and more preferably a dimethylpolysilane, a polymer of a diphenylsilane and a monophenylsilane, or a polymer of a dimethylsilane and a diphenylsilane.

The weight average molecular weight of the poorly-soluble polysilane used in the method for producing particles according to the present invention is preferably approximately 1000 to 10000, in view of the particulation efficiency of the target element A or the easiness of collecting the poorly-soluble polysilane in which particles thereof are adsorbed. The weight average molecular weight is determined by conducting gel permeation chromatograph analysis or ultrahigh-temperature gel permeation chromatograph analysis, which are calibrated using standard polystyrene samples.

In the method for producing particles according to the present invention, the element A, ions of which are to be particulated, is an element having a standard electrode potential greater than 0V. The term "standard electrode potential" means an electromotive force in the normal state of a battery made by combining a standard hydrogen electrode and an electrode to be measured.

Among elements having a standard electrode potential greater than 0V, examples of metal include a copper (0.340 V), technetium (0.400 V), niobium (0.65 V), nickel (0.116 V), ruthenium (0.680 V), rhodium (0.758 V), palladium (0.915 V), silver (0.799 V), rhenium (0.220 V), osmium (0.687 V), platinum (0.744 V), iridium (0.86 V), gold (1.002 V), mercury (0.796 V), and lead (0.249 V). Examples of semimetal having a standard electrode potential greater than 0V include germanium (0.247 V), arsenic (0.248 V), antimony (0.1504 V), selenium (0.739 V), bismuth (0.317 V), tellurium (0.521 V), and polonium (0.368 V). Examples of an element having a standard electrode potential greater than 0V, other than the metal and the semimethal, include halogens, such as iodine (1.195 V), bromine (1.604 V), chlorine (1.630 V), and sulfur (0.500 V). Among the elements A to be particulated by the method for producing particles according to the present invention, elements having a standard electrode potential no less than 0.2 V are preferable, and elements having a standard electrode potential greater than 0.7 V are more preferable. It is preferable that the element A be at least one selected from the group consisting of gold, mercury, silver, rhodium, palladium, iodine, platinum, germanium, sulfur, ruthenium, osmium, iridium, rhenium, copper, tellurium, lead, arsenic, and bismuth, more preferably at least one selected from the group consisting of gold, platinum, silver, rhodium, iodine, germanium, ruthenium, osmium, and palladium, and even more preferably at least one selected from the group consisting of gold, platinum, silver, rhodium, iodine, germanium, and palladium.

Ions of the element A in a protic solvent solution may form salts or complexes. Examples of the salts or complexes include copper (I) acetate, copper (II) acetate, copper (I) bromide, copper (II) bromide, copper (I) chloride, copper (II) chloride, copper (I) iodide, copper (II) iodide, cupric (II) nitrate, bis(2,4-pentanedionate) copper (II), potassium tetrachlorocuprate (II), ruthenium (III) chloride, ruthenium (VIII) oxide, potassium perruthenate (VII), sodium perruthenate (VII), rhodium (II) acetate, rhodium (III) chloride, rhodium (III) nitrate, bis(1,5-cyclooctadiene)-μ, μ-dichlororhodium, tris(triphenylphosphine) rhodium (I) chloride, palladium (II) acetate, palladium (II) chloride, palladium (II) bromide, palladium (II) iodide, palladium (II) oxide, palladium (II) nitrate, palladium (II) acetylacetonate, bis(2,4-pentanedionate) palladium (II), tetrakis(triphenylphosphine) palladium (0), potassium tetrachloropalladate (II), silver (I) acetate, silver (I) trifluoromethanesulfonate, silver (I) chloride, silver (I) nitrate, silver (I) p-toluenesulfonate, rhenium (III) chloride, rhenium (IV) chloride, rhenium (V) chloride, rhenium pentacarbonyl chloride, osmium (III) chloride, osmium (VIII) oxide, iridium (III) chloride, iridium (IV) chloride, iridium (III) bromide, iridium (IV) bromide, platinum (II) chloride, platinum (IV) chloride, potassium hexachloroplatinate (IV), sodium hexachloroplatinate (IV), hexachloroplatinic (IV) acid, tetrakis(triphenylphosphine) platinum (0), potassium tetrachloroplatinate (II), gold (I) chloride, gold (III) chloride, gold (III) bromide, potassium tetracyanoaurate (III), tetrachloroauric acid (III), (triphenylphosphine) gold (I) chloride, potassium dicyanoaurate (I), mercury (I) acetate, mercury (II) acetate, mercury (I) chloride, mercury (II) chloride, mercury (I) nitrate, mercury (II) nitrate, arsenic (III) chloride, arsenic (III) bromide, metaarsenious acid (III), sodium metaarsenite (III), potassium metaarsenite (III), selenium (IV) chloride, selenium (IV) bromide, selenous acid (IV), sodium selenite (IV), potassium selenite (IV), niobium (III) chloride, niobium (III) bromide, niobium (V) oxide, nickel (II) chloride, nickel (II) bromide, nickel (II) oxide, antimony (III) chloride, antimony (III) bromide, antimony (III) oxide, bismuth (III) nitrate, bismuth (III) chloride, bismuth (III) bromide, sodium (I) iodide, potassium (I) iodide, sodium (V) iodate, potassium (V) iodate, germanium (IV) chloride, germanium (IV) bromide, germanium (IV) oxide, lead (II) nitrate, lead (II) acetate, lead (II) chloride, lead (II) bromide, tellurium (IV) chloride, tellurium (IV) bromide, tellurium (IV) oxide, sodium tellurate (VI), potassium tellurate (VI), sodium sulfate (VI), potassium sulfate (VI), sodium sulfite (IV), potassium sulfite (IV), and the like.

The protic solvent solution which contains ions of the element A and to which a poorly-soluble polysilane is added may be prepared by, for example, mixing a solid or liquid sample containing a salt or complex of the element A with an appropriate protic solvent to dissolve the sample therein. There is no particular limitation on the protic solvent provided that the protic solvent is in a liquid form at a step in which ions of the element A are particulated, and may be arbitrarily selected from generally used protic solvents in view of kinds of ions of the element A, presence or absence of impurities, or kinds thereof. Examples of the protic solvent include: alcohol-based solvents, such as methanol, ethanol, isopropanol, and butanol; water; and mixed solvents thereof.

It is preferable that the element A be dissolved in a protic solvent solution. Therefore, in the case where a sample containing the element A is solid, or the element A is dispersed in a liquid sample, for example, it is preferable that a poorly-soluble polysilane be added to a solution obtained by dissolving or diluting the sample in or with a protic solvent having an ability of dissolving the element A therein.

In the method for producing particles according to the present invention, a poorly-soluble polysilane is added to a protic solvent solution containing ions of the element A to disperse the poorly-soluble polysilane in the solution. In the solution, the poorly-soluble polysilane contacts with the ions of the element A, and reduces the ions, as a result of which particles of the element A are produced. Efficient particulation of the element A can be realized by uniformly dispersing the poorly-soluble polysilane in the solution. Accordingly, it is preferable that the solution containing the added poorly-soluble polysilane be stirred. It is preferable that the solution containing the added poorly-soluble polysilane be incubated for a predetermined amount of time to improve the particulation efficiency of the element A. The time for incubation may be arbitrarily determined in view of the total amount of the solution, the amount of the added poorly-soluble polysilane, and the amount of the element A expected to be present in the solution. For example, incubation conducted for 5 minutes to 3 hours while stirring the mixture obtained by adding the poorly-soluble polysilane to the solution makes it possible to further efficiently reduce ions of the element A to produce particles of the element.

It is preferable that the amount of the poorly-soluble polysilane to be added, relative to 1% by weight of the element A in the solution, be 10 to 100% by weight, and more preferably 20 to 40% by weight, in view of the adsorption degree thereof.

The targets to be particulated using the method for producing particles according to the present invention may be ions of one kind of the element A or ions of at least two kinds of the element A. Particles containing at least two kinds of the element A may be obtained by adding the poorly-soluble polysilane to a protic solvent solution containing at least two kinds of the element A.

Although ions of the element A in the protic solvent solution are particulated by the poorly-soluble polysilane, ions of an element having a standard electrode potential equal to or less than 0V are not particulated. Therefore, the method for producing particles according to the present invention makes it possible to selectively produce particles of the element A from a protic solvent solution containing ions of various kinds of elements (for example, a protic solvent solution containing both ions of at least one kind of the element A and ions of at least one kind of elements having a standard electrode potential equal to or less than 0V).

Examples of the element having a standard electrode potential equal to or less than 0V include potassium (−2.92 V), calcium (−2.84 V), sodium (−2.71 V), titanium (−1.74 V), zinc (−0.76 V), chrome (−0.73 V), cobalt (−0.27 V), nickel (−0.23 V), tin (−0.14 V), and the like.

Particles of the element A produced by reduction aggregate. In the case where the element A is an element having a relatively heavy specific gravity, such as a transition metal, semimetal, or the like, particles of the element A precipitate. Therefore, particles of the element A produced by reduction reaction with the poorly-soluble polysilane can be easily collected by conducting simple solid-liquid separation treatment such as filtration treatment. Although both the poorly-soluble polysilane and particles of the element A are insoluble in the protic solvent solution, they can be separately collected using the difference in the specific gravities thereof, for example.

The prepared particles of the element A can be made to be adsorbed in the poorly-soluble polysilane by arbitrarily adjusting the formulation of the protic solvent solution used to particulate ions of the element A. In particular, particles of the element A can be easily collected by adsorbing the particles in the poorly-soluble polysilane, in the case where the element A is an element having a relatively light specific gravity, such as sulfur. On the other hand, in the case where the poorly-soluble polysilane is dimethylpolysilane, it is preferable that the element A be not palladium.

Particles of the element A can be more easily made to be adsorbed in the poorly-soluble polysilane, in the case where the element A is at least one selected from the group consisting of gold, mercury, silver, rhodium, iodine, platinum, germanium, sulfur, ruthenium, and bismuth, more preferably at least one selected from the group consisting of gold, silver, rhodium, iodine, platinum, germanium, and ruthenium.

In the case where a soluble polysilane is used in the solution, polysilane, in which particles of the element A are adsorbed, is also dissolved in the solution, and therefore is required to be collected by adding a poor solvent to the solution, for example, to make it precipitate or insolubilize therein. In contrast, according to the present invention, the poorly-soluble polysilane is used instead of the polysilane soluble in a protic solvent solution, and therefore, the poorly-soluble polysilane in which particles of the element A are adsorbed (a composite body of particles of the element A and the poorly-soluble polysilane) is dispersed in the solution, and can be easily collected by conducting a simple solid-liquid separation treatment such as a filtration treatment.

The composite body of the particles of the element A and the poorly-soluble polysilane may be used for various purposes. In the case where the element A is a transition metal, a semimetal, or a halogen, for example, the composite body of the particles of the element A and the poorly-soluble polysilane may be used as an additive agent to improve the electric conductivity, thermal conductivity, or photoconductivity. In the case where the element A has a catalytic ability, the composite body of the particles of the element A and the poorly-soluble polysilane may be used as a catalyst.

Moreover, baking of the composite body composed of the particles of the element A and the poorly-soluble polysilane to decompose the poorly-soluble polysilane in the composite body provides particles of the element A, from which the poorly-soluble polysilane is removed. For example, the composite body of the particles of the element A and the poorly-soluble polysilane collected by filtrating the solution after particulation is dried and then burned to decompose the poorly-soluble polysilane.

The method for producing particles according to the present invention makes it possible to particulate the element A present in a protic solvent in the form of ions, and therefore is suitably applied to collect the element A contained in factory effluent, household effluent, or the like. In addition, the method is suitably applied to collect the element A contained in samples collected from nature such as seas, lakes, bogs, rivers, or soils.

EXAMPLES

In the followings, the present invention will be explained by showing examples in further detail, but the present invention is not limited to these examples.

<Measurement of the Amount of Collected (Adsorbed) Element A.>

The amount of an element A contained in a solution obtained by particulating ions of the element A and then separating particles thereof from a poorly-soluble polysilane by conducting filtration (filtrate obtained by removing solids by filtration) was measured using an ICP emission analyzer IRIS Intrepid II XDL (manufactured by Thermo Elemental). The amount of collected (adsorbed) element A was calculated by subtracting the measured value from the amount of the element A present in the solution before the poorly-soluble polysilane was added thereto.

Example 1

Polydimethylsilane (25.10 g) and an aqueous solution containing 1000 ppm of gold (1776.81 g, containing 1776.81 mg of gold, prepared by dissolving a chlorauric acid in a hydrochloric acid) were put in a flask. The flask was left at room temperature for 2 weeks while stirring the mixture therein. Precipitates of gold were generated at the bottom of the flask. The solution was sequentially divided from the bottom in the following order of a gold precipitate portion, a liquid portion, and a polydimethylsilane powder portion. From the bottom of the solution, a mixture of the gold precipitate portion and the liquid portion was collected, and then gold precipitates were separated from the liquid portion by conducting filtration. Then, the residue of the solution was filtered to separate polydimethylsilane powders from the liquid portion. The gold precipitates and the polydimethylsilane powders were dried under reduced pressure at 60° C. to obtain gold precipitates (1167.24 mg) and purple powders (23.72 g). As a result, the collection rate of the gold precipitates was 66%. Then, the amount of gold contained in the filtrate after collecting the gold precipitates and the polydimethylsilane powders was measured, and the decreased amount (precipitated amount) of gold was calculated by subtracting the measured value from the amount of gold before the addition of the polydimethylsilane, as a result of which it was revealed that the amount of gold adsorbed in the obtained purple powders was 122 µmol/g, and the collection rate of the gold in the purple powders was 34%

Example 2

Polydimethylsilane (5.13 g) and an aqueous solution containing 1000 ppm of gold (20.10 g, containing 20.10 mg of gold, prepared by dissolving a chlorauric acid in a hydrochloric acid) were put in a flask. Methanol (50 mL) was added dropwise in the flask under nitrogen stream while conducting ice-cooling. After the temperature in the flask was raised to the room temperature, a stirring process was conducted for 90 minutes. Then, the solution was filtered, and collected powders were washed with methanol (5 mL) three times. The powders were dried under reduced pressure at 60° C. to obtain purple powders (5.10 g). After collecting powders, the amount of gold in the filtrate was measured, and the amount of gold decreased from the amount thereof before the addition of the polydimethylsilane (the amount of gold adsorbed in the polydimethylsilane) was calculated. The amount of gold adsorbed in the obtained powders and the collection rate of gold are shown in Table 1.

The thus obtained powders were subjected to wide-angle X-ray diffraction measurement. The measurement was conducted in accordance with a parallel beam method using an X-ray diffraction apparatus SmartLab 9 kW, manufactured by Rigaku Corporation, at a voltage of 45 kV and a current of 200 mA, with a radiation source of CuKα (wavelength λ=1.54 Å).

Figure 1:
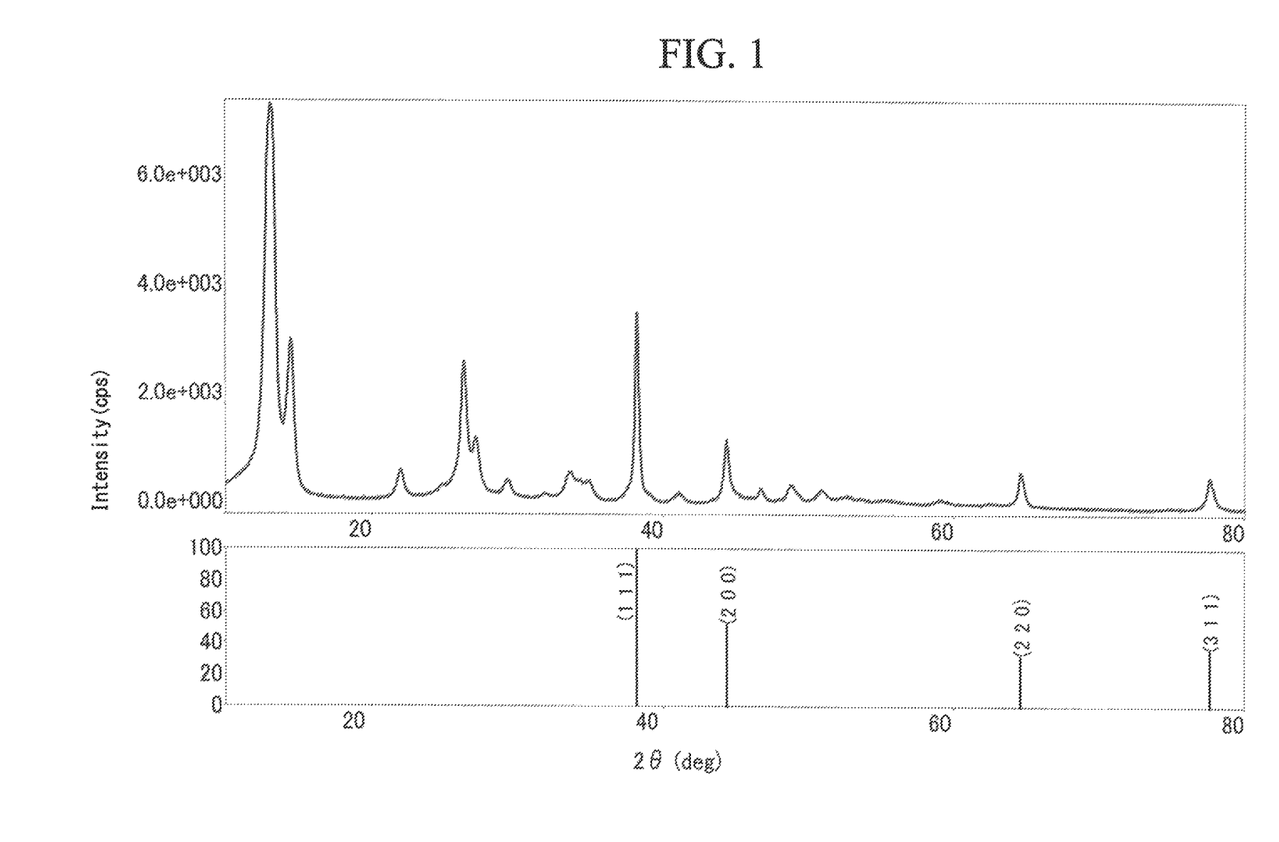
FIG. 1 is a drawing indicating an X-ray diffraction pattern of a composite body composed of gold particle and polydimethylsilane prepared in Example 2.
Figure 2:
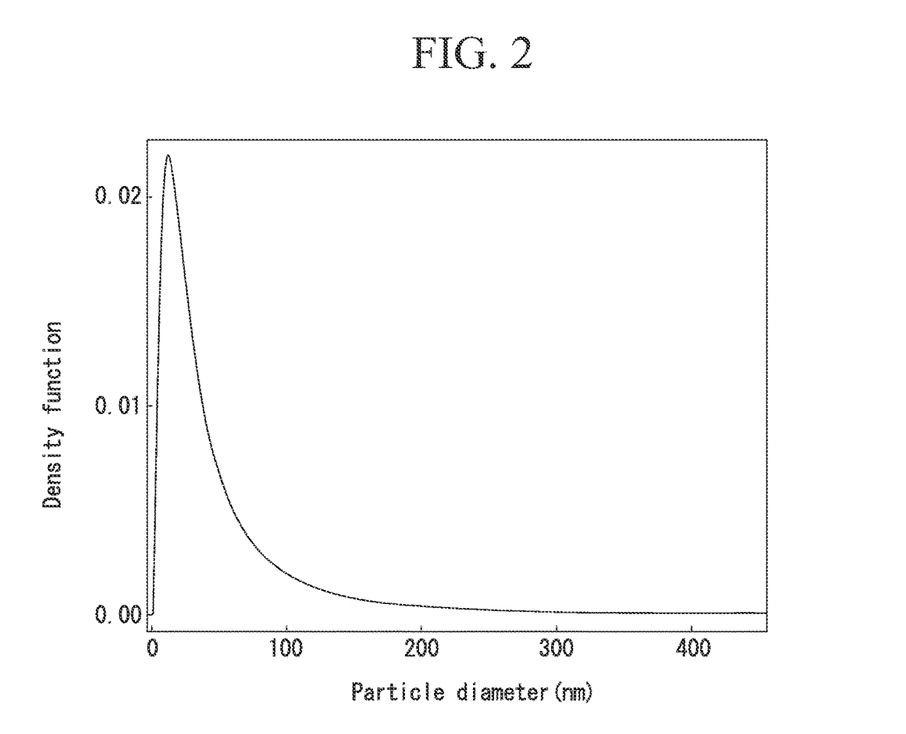
FIG. 2 is a drawing indicating results of crystallite volume distribution in the (111) plane index of a composite body composed of gold particles and polydimethylsilane prepared in Example 2.

The X-ray diffraction pattern obtained by the measurement is shown in FIG. 1, and the results of the crystallite volume distribution indicating the volume ratio relative to the crystallite diameter in the (111) plane index at a diffraction angle 2θ of 38.17° are shown in FIG. 2.

It was confirmed from the X-ray diffraction pattern shown in FIG. 1 that the measured particles were composite bodies containing gold particles. It was confirmed from the results of the crystallite volume distribution in the (111) plane index shown in FIG. 2 that the mode of gold particle diameters was 9 nm, the average thereof was 54 nm, and the medium value thereof was 30 nm.

Example 3

Gray powders (5.02 g) were obtained in a similar manner to that of Example 2, except that the used amount of polydimethylsilane was 5.09 g, an aqueous solution containing 1000 ppm of platinum (20.12 g, containing 20.12 mg of platinum, and prepared by dissolving a chloroplatinic acid in a hydrochloric acid) was used instead of an aqueous solution containing 1000 ppm of gold, and a stirring process was conducted for 66 hours. The amount of platinum adsorbed in the obtained powders and the collection rate of platinum are shown in Table 1.

Example 4

Yellow powders (5.12 g) were obtained in a similar manner to that of Example 2, except that the used amount of polydimethylsilane was 5.18 g, an aqueous solution containing 1000 ppm of silver (20.09 g, containing 20.09 mg of silver, and prepared by dissolving a silver nitrate in a nitric acid) was used instead of an aqueous solution containing 1000 ppm of gold, and a stirring process was conducted for 24 hours. The amount of silver adsorbed in the obtained powders and the collection rate of silver are shown in Table 1.

Example 5

White powders (5.05 g) were obtained in a similar manner to that of Example 2, except that the used amount of polydimethylsilane was 5.09 g, and an aqueous solution containing 1000 ppm of mercury (20.22 g, containing 20.22 mg of mercury, and prepared by dissolving a mercury chloride in a nitric acid) was used instead of an aqueous solution containing 1000 ppm of gold. The amount of mercury adsorbed in the obtained powders and the collection rate of mercury are shown in Table 1.

Example 6

Gray powders (5.05 g) were obtained in a similar manner to that of Example 2, except that the used amount of polydimethylsilane was 5.05 g, an aqueous solution containing 1000 ppm of rhodium (20.06 g, containing 20.06 mg of rhodium, and prepared by dissolving a rhodium chloride in a hydrochloric acid) was used instead of an aqueous solution containing 1000 ppm of gold, and a stirring process was conducted for 24 hours. The amount of rhodium adsorbed in the obtained powders and the collection rate of rhodium are shown in Table 1.

Example 7

Light yellow powders (5.17 g) were obtained in a similar manner to that of Example 2, except that the used amount of polydimethylsilane was 5.21 g, and an aqueous solution containing 1269 ppm of iodine (20.21 g, containing 25.65 mg of iodine, and prepared by dissolving a potassium iodide in water) was used instead of an aqueous solution containing 1000 ppm of gold. The amount of iodine adsorbed in the obtained powders and the collection rate of iodine are shown in Table 1.

Example 8

White powders (5.10 g) were obtained in a similar manner to that of Example 2, except that the used amount of polydimethylsilane was 5.09 g, an aqueous solution containing 1000 ppm of bismuth (20.21 g, containing 0.21 mg of bismuth, and prepared by dissolving a bismuth nitrate in a nitric acid) was used instead of an aqueous solution containing 1000 ppm of gold, and a stirring process was conducted for 24 hours. The amount of bismuth adsorbed in the obtained powders and the collection rate of bismuth are shown in Table 1.

Example 9

White powders (5.02 g) were obtained in a similar manner to that of Example 2, except that the used amount of polydimethylsilane was 5.07 g, an aqueous solution containing 1010 ppm of germanium (20.17 g, containing 20.37 mg of germanium, and prepared by dissolving a germanium oxide in a hydrochloric acid) was used instead of an aqueous solution containing 1000 ppm of gold, and a stirring process was conducted for 24 hours. The amount of germanium adsorbed in the obtained powders and the collection rate of germanium are shown in Table 1.

Example 10

White powders (5.02 g) were obtained in a similar manner to that of Example 2, except that the used amount of polydimethylsilane was 5.02 g, an aqueous solution containing 1000 ppm of sulfur (20.05 g, containing 20.05 mg of sulfur, and prepared by dissolving a sodium sulfate in water) was used instead of an aqueous solution containing 1000 ppm of gold, and a stirring process was conducted for 24 hours. The amount of sulfur adsorbed in the obtained powders and the collection rate of sulfur are shown in Table 1.

Example 11

Gray powders (5.03 g) were obtained in a similar manner to that of Example 2, except that the used amount of polydimethylsilane was 5.02 g, an aqueous solution containing 1000 ppm of ruthenium (20.06 g, containing 20.06 mg of ruthenium, and prepared by dissolving a ruthenium oxide in a hydrochloric acid) was used instead of an aqueous solution containing 1000 ppm of gold, and a stirring process was conducted for 24 hours. The amount of ruthenium adsorbed in the obtained powders and the collection rate of ruthenium are shown in Table 1.

Example 12

Gray powders (5.03 g) were obtained in a similar manner to that of Example 2, except that the used amount of polydimethylsilane was 5.07 g, an aqueous solution containing 1000 ppm of osmium (20.47 g, containing 20.47 mg of osmium, and prepared by dissolving an osmium oxide in water) was used instead of an aqueous solution containing 1000 ppm of gold, and a stirring process was conducted for 24 hours. The amount of osmium adsorbed in the obtained powders and the collection rate of osmium are shown in Table 1.

Example 13

White powders (5.13 g) were obtained in a similar manner to that of Example 2, except that the used amount of polydimethylsilane was 5.17 g, an aqueous solution containing 1100 ppm of iridium (20.14 g, containing 22.15 mg of iridium, and prepared by dissolving an iridium chloride in water) was used instead of an aqueous solution containing 1000 ppm of gold, and a stirring process was conducted for 24 hours. The amount of iridium adsorbed in the obtained powders and the collection rate of iridium are shown in Table 1.

Example 14

White powders (5.13 g) were obtained in a similar manner to that of Example 2, except that the used amount of polydimethylsilane was 5.08 g, an aqueous solution containing 1280 ppm of rhenium (20.31 g, containing 26.00 mg of rhenium, and prepared by dissolving a potassium perrhenate in a hydrochloric acid) was used instead of an aqueous solution containing 1000 ppm of gold, and a stirring process was conducted for 24 hours. The amount of rhenium adsorbed in the obtained powders and the collection rate of rhenium are shown in Table 1.

Example 15

White powders (5.13 g) were obtained in a similar manner to that of Example 2, except that the used amount of polydimethylsilane was 5.11 g, an aqueous solution containing 1010 ppm of copper (20.07 g, containing 20.27 mg of copper, and prepared by dissolving a copper acetate in an acetic acid) was used instead of an aqueous solution containing 1000 ppm of gold, and a stirring process was conducted for 24 hours. The amount of copper adsorbed in the obtained powders and the collection rate of copper are shown in Table 1.

Example 16

Gray powders (5.21 g) were obtained in a similar manner to that of Example 2, except that the used amount of polydimethylsilane was 5.25 g, an aqueous solution containing 1230 ppm of tellurium (20.29 g, containing 24.96 mg of tellurium, and prepared by dissolving a tellurium oxide in a hydrochloric acid) was used instead of an aqueous solution containing 1000 ppm of gold, and a stirring process was conducted for 24 hours. The amount of tellurium adsorbed in the obtained powders and the collection rate of tellurium are shown in Table 1.

Example 17

White powders (5.40 g) were obtained in a similar manner to that of Example 2, except that the used amount of polydimethylsilane was 5.41 g, and an aqueous solution containing 1000 ppm of lead (20.76 g, containing 20.76 mg of lead, and prepared by dissolving a lead nitrate in a nitric acid) was used instead of an aqueous solution containing 1000 ppm of gold. The amount of lead adsorbed in the obtained powders and the collection rate of lead are shown in Table 1.

Example 18

White powders (5.03 g) were obtained in a similar manner to that of Example 2, except that the used amount of polydimethylsilane was 5.05 g, an aqueous solution containing 1060 ppm of arsenic (20.40 g, containing 21.62 mg of arsenic, and prepared by dissolving a sodium metaarsenite in water) was used instead of an aqueous solution containing 1000 ppm of gold, and a stirring process was conducted for 24 hours. The amount of arsenic adsorbed in the obtained powders and the collection rate of arsenic are shown in Table 1.

Example 19

Gray powders (5.11 g) were obtained in a similar manner to that of Example 2, except that the used amount of polydimethylsilane was 5.14 g, and an aqueous solution containing 1000 ppm of palladium (20.31 g, containing 20.31 mg of palladium, and prepared by dissolving a palladium chloride in a hydrochloric acid) was used instead of an aqueous solution containing 1000 ppm of gold. The amount of palladium adsorbed in the obtained powders and the collection rate of palladium are shown in Table 1.

Example 20

Purple powders (5.16 g) were obtained in a similar manner to that of Example 2, except that the used amount of polydimethylsilane was 5.18 g, an aqueous solution containing gold and sodium (standard electrode potential: −2.714 V) (20.18 g, containing 9.89 mg of gold and 10.29 mg of sodium, and prepared by dissolving a chlorauric acid and a sodium chloride in a hydrochloric acid) was used instead of an aqueous solution containing 1000 ppm of gold, and a stirring process was conducted for 24 hours. The amount of gold and sodium adsorbed in the obtained powders and the collection rate of gold and sodium are shown in Table 1.

Example 21

Gray powders (15.13 g) were obtained in a similar manner to that of Example 2, except that polydiphenylsilane (15.55 g) was used instead of polydimethylsilane, and an aqueous solution containing 1000 ppm of palladium (20.35 g, containing 20.35 mg of palladium, and prepared by dissolving a palladium chloride in a hydrochloric acid) was used instead of an aqueous solution containing 1000 ppm of gold. The amount of palladium adsorbed in the obtained powders and the collection rate of palladium are shown in Table 1.

Example 22

Gray powders (5.02 g) were obtained in a similar manner to that of Example 2, except that a polysilane (e) represented by the following formula (e) (polymer composed of a diphenylsilane and a monophenylsilane at 50:50% by mole) (5.07 g) was used instead of polydimethylsilane, an aqueous solution containing 100 ppm of palladium (20.16 g, containing 2.02 mg of palladium, and prepared by dissolving a palladium chloride in a hydrochloric acid) was used instead of an aqueous solution containing 1000 ppm of gold, and a stirring process was conducted for 24 hours. The amount of palladium adsorbed in the obtained powders and the collection rate of palladium are shown in Table 1.

Example 23

Gray powders (5.02 g) were obtained in a similar manner to that of Example 2, except that a polysilane (f) represented by the following formula (f) (polymer composed of a dimethylsilane and a diphenylsilane at 50:50% by mole) (5.03 g) was used instead of polydimethylsilane, an aqueous solution containing 100 ppm of palladium (20.20 g, containing 2.02 mg of palladium, and prepared by dissolving a palladium chloride in a hydrochloric acid) was used instead of an aqueous solution containing 1000 ppm of gold, and a stirring process was conducted for 24 hours. The amount of palladium adsorbed in the obtained powders and the collection rate of palladium are shown in Table 1.

Example 24

Purple powders (4.98 g) were obtained in a similar manner to that of Example 2, except that polydiphenylsilane (5.00 g) was used instead of polydimethylsilane, an aqueous solution containing 90 ppm of gold (20.43 g, containing 1.84 mg of gold, and prepared by dissolving a chlorauric acid in a hydrochloric acid) was used instead of an aqueous solution containing 1000 ppm of gold, and a stirring process was conducted for 24 hours. The amount of gold adsorbed in the obtained powders and the collection rate of gold are shown in Table 1.

Example 25

Purple powders (4.93 g) were obtained in a similar manner to that of Example 2, except that the polysilane (e) (5.03 g) was used instead of polydimethylsilane, an aqueous solution containing 90 ppm of gold (20.27 g, containing 1.82 mg of gold, and prepared by dissolving a chlorauric acid in a hydrochloric acid) was used instead of an aqueous solution containing 1000 ppm of gold, and a stirring process was conducted for 24 hours. The amount of gold adsorbed in the obtained powders and the collection rate of gold are shown in Table 1.

Example 26

Purple powders (5.01 g) were obtained in a similar manner to that of Example 2, except that the polysilane (f)

(5.01 g) was used instead of polydimethylsilane, an aqueous solution containing 90 ppm of gold (20.47 g, containing 1.84 mg of gold, and prepared by dissolving a chlorauric acid in a hydrochloric acid) was used instead of an aqueous solution containing 1000 ppm of gold, and a stirring process was conducted for 24 hours. The amount of gold adsorbed in the obtained powders and the collection rate of gold are shown in Table 1.

TABLE 1

| Example | Element A | Polysilane | Amountt of adsorbed element A (µmol/g) | Collection rate of element A (%) |
|---|---|---|---|---|
| 2 | Gold | Polydimethylsilane | 20 | 99 |
| 3 | Platinum | Polydimethylsilane | 20 | 98 |
| 4 | Silver | Polydimethylsilane | 35 | 97 |
| 5 | Mercury | Polydimethylsilane | 13 | 64 |
| 6 | Rhodium | Polydimethylsilane | 38 | 98 |
| 7 | Iodine | Polydimethylsilane | 32 | 82 |
| 8 | Bismuth | Polydimethylsilane | 7 | 37 |
| 9 | Germanium | Polydimethylsilane | 50 | 95 |
| 10 | Sulfur | Polydimethylsilane | 21 | 67 |
| 11 | Ruthenium | Polydimethylsilane | 37 | 95 |
| 12 | Osmium | Polydimethylsilane | 21 | 100 |
| 13 | Iridium | Polydimethylsilane | 3 | 14 |
| 14 | Rhenium | Polydimethylsilane | 4 | 14 |
| 15 | Copper | Polydimethylsilane | 22 | 34 |
| 16 | Tellurium | Polydimethylsilane | 10 | 26 |
| 17 | Lead | Polydimethylsilane | 4 | 20 |
| 18 | Arsenic | Polydimethylsilane | 13 | 23 |
| 19 | Palladium | Polydimethylsilane | 35 | 95 |
| 20 | Gold | Polydimethylsilane | 10 | 99 |
|  | Sodium | Polydimethylsilane | 1 | 1 |
| 21 | Palladium | Polydiphenylshilane | 5 | 71 |
| 22 | Palladium | Polysilane (e) | 4 | 97 |
| 23 | Palladium | Polysilane (f) | 4 | 97 |
| 24 | Gold | Polydiphenylshilane | 2 | 96 |
| 25 | Gold | Polysilane (e) | 2 | 95 |
| 26 | Gold | Polysilane (f) | 2 | 96 |

As shown in Examples 1 to 11, the elements having a standard electrode potential equal to or more than 0.2 V were reduced with the polydimethylsilane in protic solvent solutions containing water, methanol, or the like, and thereby causing the obtained particles adsorbed in the polydimethylsilane. In Example 1, the gold particles were collected as a precipitate separately from the polydimethylsilane. The collection rates of gold, platinum, silver, rhodium, iodine, germanium, ruthenium, osmium, and palladium were particularly very high. The results of Example 20 indicates that particles of an element having a standard electrode potential greater than 0V can be selectively obtained even when a protic solvent solution contains both ions of an element having a standard electrode potential equal to or less than 0V and ions of the element having a standard electrode potential greater than 0V. The comparison with Examples 19, 21, 22, and 23 indicates that the use of the polydimethylsilane, the polymer composed of the diphenylsilane and the monophenylsilane, or the polymer composed of the dimethylsilane and the diphenylsilane undoubtedly improves the collection rate of palladium relative to the use of polydiphenylsilane, and that the collection rates differ depending on the kind of a poorly-soluble polysilane used.

INDUSTRIAL APPLICABILITY

The method for producing particles according to the present invention and the composite body of particles of an element having a standard electrode potential greater than 0V and a polysilane are available in a field to collect useful elements from effluents or water collected from nature or a purification treatment field, since they make it possible to efficiently and simply particulate ions of an element having a standard electrode potential greater than 0V present in a protic solvent solution.

The invention claimed is:
1. A method for producing particles of an element having a standard electrode potential greater than 0V, comprising:
  mixing a protic solvent solution comprising ions of at least one element having a standard electrode potential greater than 0V and a protic solvent, with a dimethylpolysilane, to obtain particles of the element from ions of the element having a standard electrode potential greater than 0V
  wherein the element is at least one selected from the group consisting of gold, platinum, silver, rhodium, iodine, germanium, ruthenium, osmium, and palladium.
2. The method for producing particles of an element having a standard electrode potential greater than 0V according to claim 1, further comprising a step of collecting the particles of the element having a standard electrode potential greater than 0V adsorbed in the dimethylpolysilane.
3. The method for producing particles of an element having a standard electrode potential greater than 0V according to claim 2, further comprising a step of burning the particles of the element having a standard electrode potential greater than 0V adsorbed in the dimethylpolysilane to obtain particles from which the dimethylpolysilane is removed.
4. The method for producing particles of an element having a standard electrode potential greater than 0V according to claim 3, wherein the protic solvent solution further comprises ions of at least one element having a standard electrode potential equal to or less than 0V.
5. The method for producing particles of an element having a standard electrode potential greater than 0V according to claim 2, wherein the protic solvent solution further comprises ions of at least one element having a standard electrode potential equal to or less than 0V.
6. The method for producing particles of an element having a standard electrode potential greater than 0V according to claim 1, wherein the protic solvent solution further comprises ions of at least one element having a standard electrode potential equal to or less than 0V.

* * * * *